(12) United States Patent
Cordova et al.

(10) Patent No.: US 8,748,742 B1
(45) Date of Patent: Jun. 10, 2014

(54) WIRE THEFT PROTECTION FOR PULL BOXES

(75) Inventors: Carlos J. Cordova, Los Angeles, CA (US); Sammy Vargas, Rosemead, CA (US)

(73) Assignee: Corbas Marketing Inc., Los Angeles, CA (US)

( * ) Notice: Subject to any disclaimer, the term of this patent is extended or adjusted under 35 U.S.C. 154(b) by 126 days.

(21) Appl. No.: 13/359,502

(22) Filed: Jan. 27, 2012

(51) Int. Cl.
*H05K 5/00* (2006.01)
*E05B 65/00* (2006.01)

(52) U.S. Cl.
USPC ........ 174/50; 174/37; 70/57; 70/158; 70/164; 248/551

(58) Field of Classification Search
USPC ....... 174/50, 17 R, 520, 37; 70/57.1, 57, 168, 70/77, 158, 164; 248/551; 220/3.2, 3.3, 220/3.9
See application file for complete search history.

(56) References Cited

U.S. PATENT DOCUMENTS

| | | | | |
|---|---|---|---|---|
| 4,339,629 A * | 7/1982 | Stanmore | ......................... | 174/50 |
| 5,197,307 A * | 3/1993 | Abbott, Jr. | ......................... | 70/57 |
| 7,906,726 B1 * | 3/2011 | Burkett | ......................... | 70/57.1 |
| 8,302,796 B1 * | 11/2012 | Johnson | ......................... | 248/551 |
| 8,347,670 B2 * | 1/2013 | Rix | .................. | 70/168 |

\* cited by examiner

*Primary Examiner* — Angel R Estrada
(74) *Attorney, Agent, or Firm* — William L. Chapin (57) ABSTRACT

A kit and method for preventing theft of wires interconnected within a pull box includes a steel cover plate having a downwardly protruding cup which has a central perforation in its base that receives the upstanding shank of a J-bolt anchored in concrete poured into a bore made in the floor of a pit holding the pull box. A template plate inserted into the open upper end of the pullbox has a central hole which receives the shank of the J-bolt while the concrete is hardening to maintain the pull box centered on the J-bolt, removed after the concrete has hardened, and replaced by the cover plate which is secured in place by tightening an oval external cross-section security nut onto the upper surface of the cup base plate using a novel socket wrench.

14 Claims, 12 Drawing Sheets

WIRE THEFT PROTECTION FOR PULL BOXES

BACKGROUND OF THE INVENTION

A. Field of the Invention

The present invention relates to electrical junction boxes which are known as pull boxes which are used to enclose interconnections between electrical power mains cables and electrical power distribution cables to devices such as municipal and highway street lighting fixtures, traffic signals and the like. More particularly, the invention relates to a novel cover lid, kit and method for upgrading existing pull boxes used for street lighting which include a concrete vault that is buried in the ground near a light standard for providing power to a street or highway light, the cover lid having a novel construction which thwarts unauthorized access to the interior of the pull box to thus protect against theft of copper wire cables leading into and out of the pull box.

B. Description of Background Art

Electrical junction boxes are used widely to connect electrical power input cables of street lights installed along streets and highways to electrical power mains. Such junction boxes, for reasons which will become apparent from the following discussion, are typically referred to as pull boxes. The pull boxes are typically installed in shallow pits dug into the ground, and have generally the form of a rectangular ring-shaped concrete shell. The open bottom of the shell is fitted down into a pit which has been dug into the ground and has two or more conduits that protrude upwardly from the bottom of the pit. The conduits have protruding outwardly from open upper ends thereof insulated electrical power line cables which are strung through the bores of the conduits, and include a power source conduit that contains cables which are connected at distal ends thereof to a power pole or other source of electrical power, and pulled through the conduit, which is horizontally disposed under the ground. The pull box pit also has a second conduit which is disposed between the pit and a destination requiring electrical power, such as a street light or highway lighting fixture.

Within the hollow, interior vault-like space of the pull box shell, electrical interconnections or splices are made between power mains conductors and conductors leading to a lighting fixture or other electrical power consuming device. Usually, the interconnections include high-current fuses. After interconnecting splices have been made between power mains conductors and power distribution conductors which extend out through the exit conduit to the street light or other electrical device, a cover lid is installed on the pull box.

Pull boxes of the type described above are used extensively for such applications as providing electrical power to a row of light standards used to illuminate a street or highway. In such applications, electrical power from a power line main located near one of the light standards is supplied to a first light standard through electrical interconnections made between power cables entering the pull box through a first, power mains source conduit and supply cables to the light standard exiting the pull box through a second, feeder conduit disposed between the pull box and the first light standard.

In a typical power distribution arrangement for a row of street or highway light standards, a first pull box which provides power to a first light standard in a row or chain, also has protruding into the interior space at the end of a third conduit which contains electrical wires that are disposed through the third conduit which runs under the surface of the ground to a second pull box located near a second light standard in a row of light standards.

Electrical connections are also made in the first pull box between the power mains cables and the cables leading to the second pull box, thus providing electrical power from the mains to the second light fixture.

In this way, electrical power from a single power mains source is provided to a row of street lighting fixtures in a series of pull boxes containing interconnected electrical wires in an arrangement sometimes referred to as a "daisy chain."

Although the daisy chain power distribution arrangement of pull boxes described above is straight forward and efficient, problems have recently arisen when the arrangement is implemented with existing pull boxes, for the following reasons.

In recent years, the price of copper has risen sharply, from a cost of one dollar US per pound in December 2008 to four dollars and fifty cents US per pound in 2011. Because of the steep rise in the price of copper as a commodity, thieves have been incentivized to engage in theft of copper wire which is then sold to scrap dealers.

One technique for stealing copper wire which has gained in popularity with thieves involves removing the lid of any pull box in a daisy-chain of pull boxes, removing the lid from an adjacent pull box in a daisy chain, freeing the ends of the wires in both pull boxes by cutting the wires, and pulling the freed lengths of wires out of one or the other of the pull boxes. There have been several well documented cases in the United States where thieves who made the initial cuts in daisy-chain power cables, apparently oblivious to the fact that cables carried electrical power, were incinerated for their efforts.

In response to the problem of dangers to the public resulting from the loss of street or highway lighting because of theft of copper wire used to supply power to the lights, the present inventor invented a security enclosure for pull boxes. That prior-art security enclosure has various security measures which thwart access to wire cables contained within the enclosure, and has proved to substantially reduce theft of wire from pull boxes fitted with the security enclosures. However, as the price of copper has continued to rise, copper-wire thieves have gotten more aggressive, and have sometimes been able to breach the security features of presently manufactured and marketed security enclosures. Accordingly, the present inventor has been motivated to develop a wire theft protection enclosure which provides even greater protection than prior art devices.

OBJECTS OF THE INVENTION

An object of the present invention is to provide an enclosure for pull box type electrical junction boxes used to enclose electrical interconnections between electrical power mains cables and power distribution cables connected to street lights, traffic signals and the like, the enclosure having construction features which make access to cables contained within the pull box difficult, thus protecting wire cables from theft.

Another object of the invention is to provide a wire theft protection enclosure which is useable with the concrete shell of an existing pull-box electrical junction box that is installed in the ground.

Another object of the invention is to provide a modification kit and method of using the kit to upgrade existing vault-type pull boxes, the upgrade securing the pull box against removal from the ground, and securing the interior of the pull box against access, thus thwarting theft of wire cables which are interconnected within the box.

Another object of the invention is to provide novel locking nuts and tools for torquing the nuts to secure a cover onto a pull box type electrical junction box and thereby thwart unauthorized access to wires within the pull box.

Another object of the invention is to provide a novel template tool and method for securing a pull box against removal from the ground.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a novel wire theft protection enclosure and method for thwarting theft of wire cables which are interconnected within and therefore accessible from the interior of vault-type electrical junction boxes which are buried in the ground and commonly referred to as pull boxes. According to the invention, a kit is provided for upgrading existing vault-type pull boxes which are installed in to ground near street or highway light standards and traffic lights and other such electrical devices that are located on public thoroughfares and owned and operated by a city, state or other governmental unit. The invention includes novel keyed fastener nuts and tools for torquing the fastener nuts, and a novel template tool and method for securing a pull box in the ground.

A method for retro-fitting the novel wire protector enclosure according to the present invention includes the following steps:

First, electrical power supplied to an existing pull box-type electric junction box is shut off.

Second, the existing concrete lid of the pull box is removed.

Third, the pull box, which consists essentially of rectangular ring-shaped concrete shell with vertically disposed side walls and a rectangularly shaped lid which fits in a ring-shaped recess formed in the upper inner side walls of the shell, is removed from the ground by digging up soil adjacent to the exterior of the shell, and pulling the box out of the ground, thus exposing power inlet and power outlet conduits carrying insulated electrical cables which are interconnected to each other through connectors containing electrical fuses, within the space within the ground which was previously enclosed by the shell and lid of the concrete pull box.

Fourth, the area of the pit in which the pull box was installed is cleared of debris, and a hole, e.g., a 0.4-inch diameter, 4-feet deep hole is bored into the ground perpendicularly downwards from the center of the floor of the pit.

Fifth, a J-bolt which has a laterally disposed lower leg having a length of about 3 inches, and a straight longitudinally elongated shank having a length of about 5 feet extending perpendicularly upwards from the laterally disposed leg is inserted into the hole.

Sixth, the shell of the concrete pull box is inserted back into the pit, and centered on the upstanding shank of the J-bolt.

Seventh, concrete is poured inside and outside of the concrete shell of the pull box to a depth of a few inches, and to the full depth of the J-bar bore hole.

Eighth, while the concrete is still semi-fluid, an H-shaped template tool with a centrally located hole is fitted into the rectangular open upper end of the pull box shell, and onto an upper peripheral ledge within the shell, and the shell is moved until the central hole is positioned above the upper end of the shank of the J-box, and the template moved downwardly so that the shank of J-bolt protrudes upwardly through the centrally located template hole, thus aligning a central vertical axis of the pull box shell with the longitudinal axis of the J-bolt.

Ninth, a nut is screwed onto the protruding threaded shank of the J-bolt, and tightened down onto the upper surface of the template to thus maintain the pull box shell centered on the vertically disposed longitudinal axis of the J-bolt while the concrete is hardening.

Tenth, a water drain or "weep" hole is made in the solidifying, semi-liquid concrete by inserting a stake down through the semi-liquid concrete and into the base of the pit, removing the stake, and sufficient time allowed for the concrete to solidity.

Eleventh, the nut holding the template to the shank of the J-bolt is removed and the template is removed.

Twelfth, a hex nut is threaded down to a specified distance, e.g., of 3.25 inches, below the upper transverse end of the J-bolt shank.

Thirteenth, a novel steel enclosure cover lid having a centrally located cylindrical shaped cup protruding downwardly from its lower surface is placed on the upper peripheral surface of the pull box shell, with the shank of the J-bolt protruding upwards through a centrally located hole through a bottom transverse end wall of the cup, which seats on the upper surface of the bottom hex nut.

Fourteenth, a novel elliptical cross section nut is manually threaded onto protruding shank of the J-bolt, and tightened down onto the upper surface of the cup base plate of the cover lid cup.

Fifteenth, the oval nut is further tightened using a novel oval cross section wrench socket.

Sixteenth, a nut having non-standard, pentagonal cross section is threaded onto the protruding shank of the J-bolt and tightened down onto the upper surface of the elliptical nut.

Seventeenth, a cap plug having an upper flange which has a flat upper surface and a square drive socket depending downwardly from the flat upper surface, and an externally threaded cylindrical sleeve protruding downwardly coaxially from the flange is threaded downwardly into internal threads in the cup, thus securing the enclosure lid cover to the pull box.

DESCRIPTION OF THE PREFERRED EMBODIMENTS

Figure 1A:
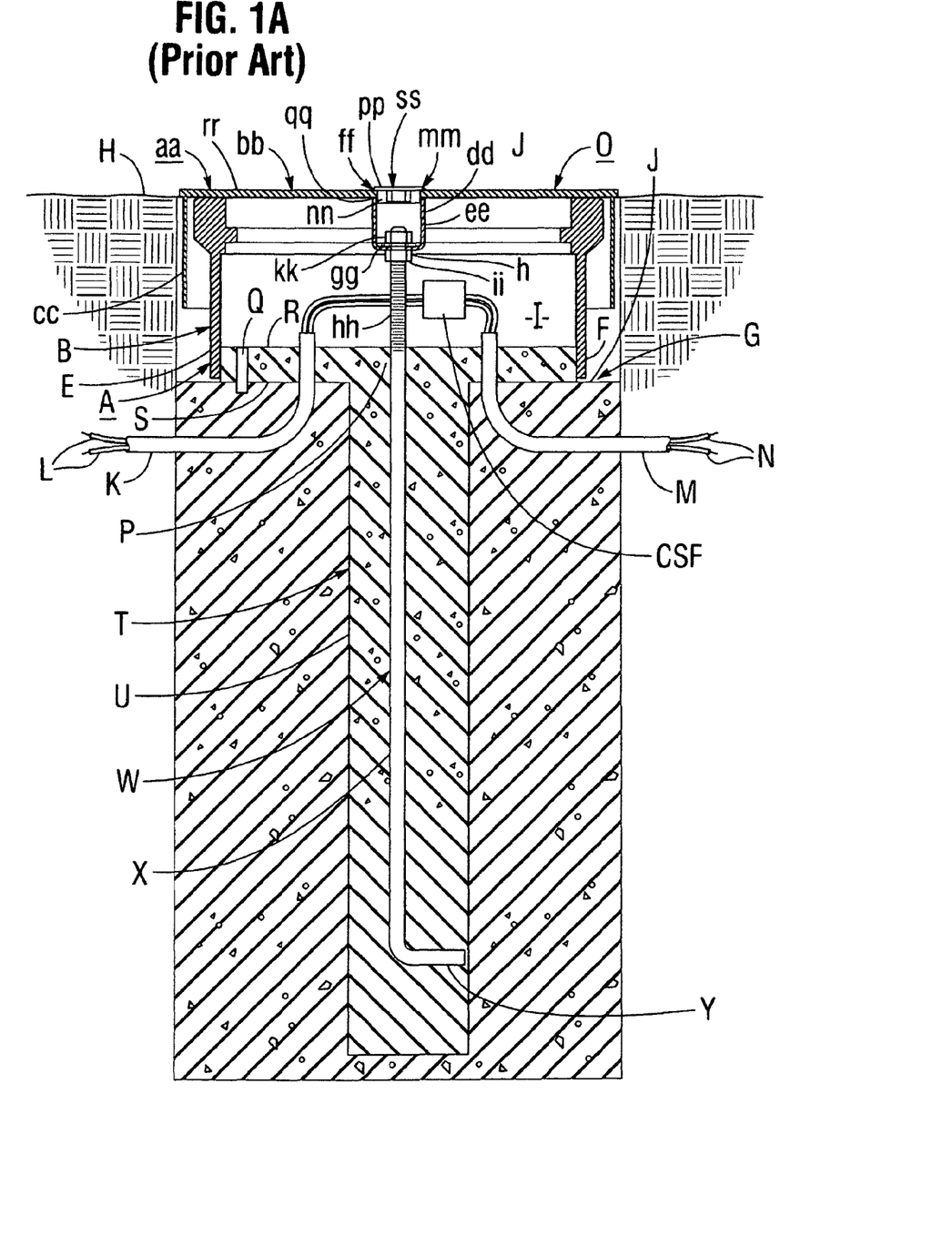
FIG. 1A is a vertical medial sectional view showing a prior art wire protection enclosure installed in the ground.
Figure 1B:
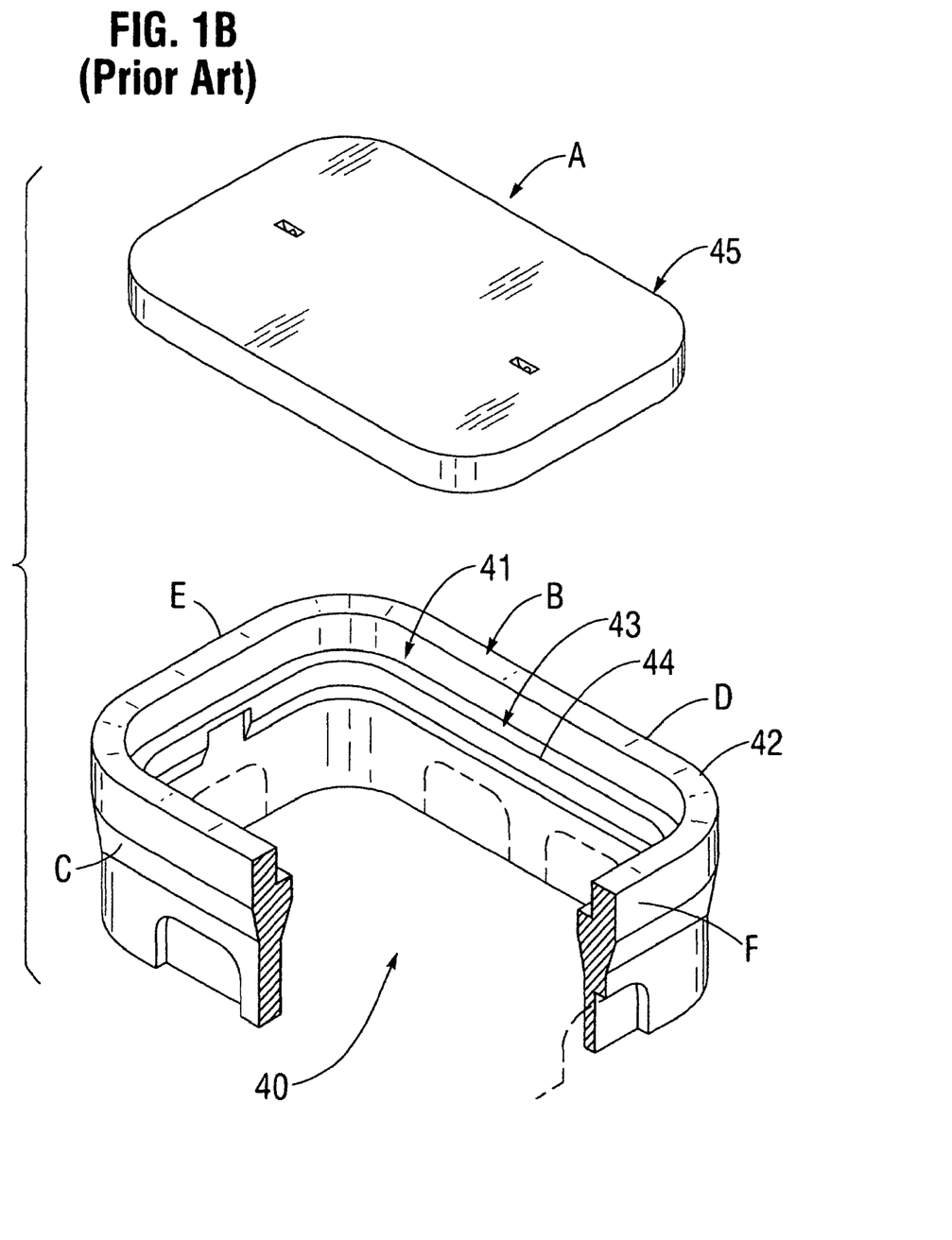
FIG. 1B is an exploded view of a concrete pull box of the type which the wire protection enclosure according to the present invention is used.

FIGS. 1A and 1B illustrate a concrete pull-box type electrical junction box which is typically installed in the ground near an electrical light standard, and used to connect input power cables from the light standard to electric power mains cables contained in underground conduits. FIG. 1A also shows installed on the pull box a prior art wire theft protection enclosure which was invented and introduced by the present inventor.

Referring to FIGS. 1A and 1B, it may be seen that a pull-box type electrical junction box A of the type the present invention is intended to be used with includes a concrete shell B that has generally the shape of a rectangular ring-shape which has vertically disposed front, rear, left and right walls C, D, E and F of generally uniform thickness. As shown in FIG. 1A, the shell B is sunk into a pit G dug into the surface of the ground H, the pit having a rectangular box-like shape which is similar to the outline shape of the shell, but slightly larger.

As shown in FIGS. 1A and 1B, the shell B has a hollow rectangular block-shaped interior space I. As shown in FIG. 1A, interior space I has protruding upwards through the earthen floor or base wall J of pit G the open upper ends of two or more electrical conduits from which electric power cables protrude. Thus, for example, FIG. 1A shows a first electrical conduit K from which protrude power mains cables L which are connected at distal ends thereof to a power pole or other sources of electrical power.

The interior space I of pull box shell B also has protruding upwardly into the interior space a second conduit M from which protrude electrical power distribution cables N which are connected at distal ends thereof to a device which requires electrical power, such as a street or highway light standard.

Individual pairs of copper wire conductors of input power mains cable L and power distribution cables N are electrically interconnected within interior space I by connector splices and fuses CSF.

As shown in FIG. 1A, a prior-art wire protective enclosure O for pull box A includes a poured concrete base wall P. Upwardly protruding ends of conduits K and M protrude through poured concrete base P into interior I of pull box shell B. A small diameter water drain hole or weep hole Q is also disposed downwardly between the upper surface R and the lower surface S of concrete base P.

Prior art wire protector enclosure O also includes an anchor post assembly T for securing the pull box from being pulled upwards out of pit G. The anchor post assembly T includes an elongated, straight circular cross-section bore hole U which is bored into the ground beneath the upper surface of the floor of pit G.

Bore hole U has disposed longitudinally upwards therethrough the shank X of a J-bolt W which has a short laterally disposed lower leg Y. J-bolt W is secured within bore hole U by concrete which is poured continuously with concrete poured to form base P of the wire protector enclosure O. The shank X of the J-bolt W protrudes upwardly through the poured concrete into the interior space of shell B.

As shown in FIG. 1A, prior art wire protection enclosure O includes a cover aa which has a flat rectangularly-shaped cover plate bb and a rectangular ring-shaped flange wall or shroud cc which depends perpendicularly downwards from the outer peripheral edge of the cover plate bb, and circumscribes or peripherally encloses an upper part of the outer peripheral wall surface of concrete shell B.

As shown in FIG. 1A, cover plate bb of cover aa has through its thickness dimension a centrally located, vertically disposed bore dd in which is welded a cylindrically-shaped cup ee. Cup ee has at its upper end an upper circular opening ff which is co-planar with the upper surface of cover plate bb, and has at its lower end a circular disk-shaped lower end plate gg. Lower end plate gg has through its thickness dimension a coaxially located circular hole through which protrudes the upper threaded end hh of J-bolt shank X.

A hex nut is threaded onto the threaded upper end hh of the shank X of J-bolt w and threaded downwardly a predetermined distance below the upper transverse end jj of the J-bolt.

Cover aa of security enclosure O is secured in place to pull box A by threading a special nut kk having a non-standard pentagonal cross section onto the threaded upper end hh of J-bolt shank X, and then tightening the nut ii down onto the upper surface jj of lower end plate gg of cup ee of cover plate bb.

Access to nut kk is limited by an upper end cap mm. End cap mm has a lower cylindrically-shaped body nn which is externally threaded and threadably tightenable into a threaded entrance bore oo of cup ee. Upper end cap mm has at the upper end thereof a circular disk-shaped end plate pp of larger diameter than cup ee. Upper end cap mm has a lower annular ring shaped flat flange wall qq which extends radially outwards from body nn and is tightened down against the upper surface rr of cover plate bb of upper end plate aa by inserting a square drive lug of a drive wrench into a square blind bore ss which extends downwardly into the upper surface tt of upper end cap mm.

FIG. 1B illustrates a pull box A of the type the wire protection enclosure according to the present invention is intended to be used for. As previously described, pull box A includes a concrete shell B that has generally the shape of a rectangular laterally elongated, bottomless and topless box, i.e., a rectangular ring-shaped shell, that has vertically disposed sides walls including front and rear parallel laterally disposed side walls C and D, and left and right fore-and-aft disposed, shorter side walls E and F, which join perpendicularly at front and rear ends thereof to the front and rear side walls. As shown in FIG. 1B, shell B has a bottom opening 40 which has a rectangular plan-view shape. Shell B also has an upper opening 41 which also has a rectangular shape and is concentric with but larger than the bottom opening 40. Upper opening 41 extends perpendicularly downwards from an upper flat horizontally disposed rectangular ring-shaped end face 42 of shell B. Upper opening 41 terminates a short distance below upper ring-shaped end face 42 in a ledge 43 which has a horizontally disposed rectangular ring-shaped upper face 44.

As may be understood by referring to FIG. 1B, pull box A includes a cover lid 45 which has the shape of a thin rectangular block that has an outline shape slightly smaller than upper opening 41 of shell B. Lid 45 is also made of cast concrete and has a thickness approximately equal to the vertical distance between upper face 44 of ledge 43 and upper end face 42 of shell B.

With the foregoing construction of a conventional pull box A, cover lid 45 is installed on the pull box by inserting the lid into upper opening 41 of shell A, and seats on and is retained on ledge 43 by the force of gravity acting on the cover lid.

Referring now to FIGS. 2-5, it may be seen that a wire theft protection enclosure 50 according to the present invention includes an enclosure cover 51 which is installable over upper opening 41 of a pull box A, of the type shown in FIG. 1B.

As shown in FIGS. 2-10, enclosure cover 51 according to the present invention includes a flat laterally elongated rectangular steel cover plate 52 with radiused corners. Cover plate 52 has depending perpendicularly downwardly from peripheral edges thereof a vertically disposed flange wall 53 which has the form of thin uniform thickness plate which is formed into a rectangular ring.

Figure 2:
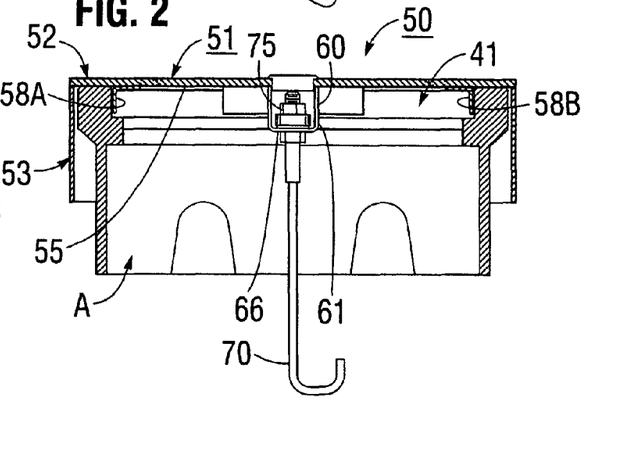
FIG. 2 is a vertical medial sectional view of a wire protection enclosure according to the present invention.
Figure 3:
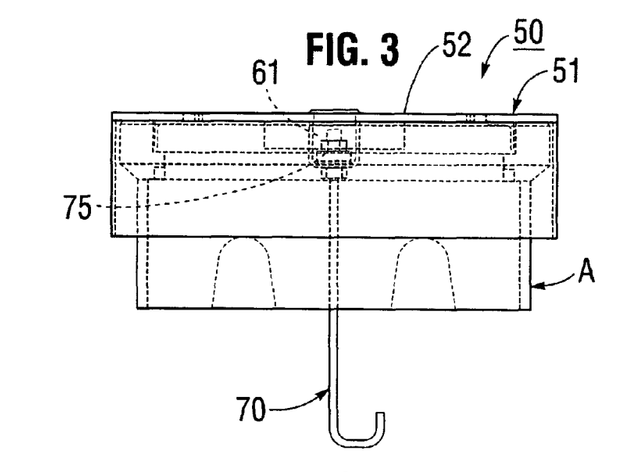
FIG. 3 is a front elevation view of the enclosure of FIG. 2, showing certain parts thereof in phantom.
Figure 4:
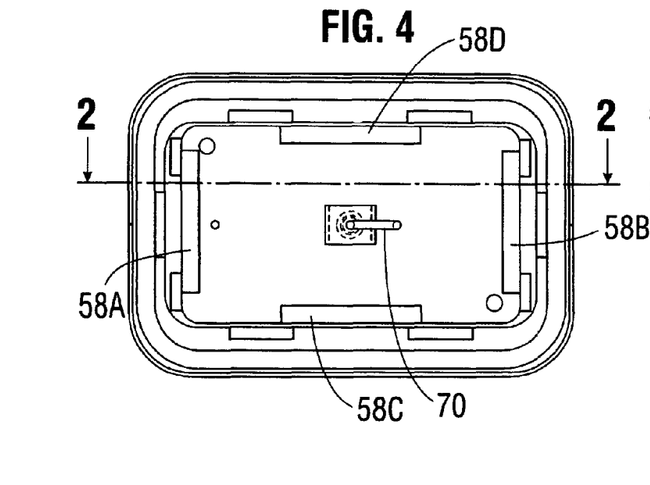
FIG. 4 is an upper plan view of the enclosure of FIGS. 2 and 3.
Figure 5:
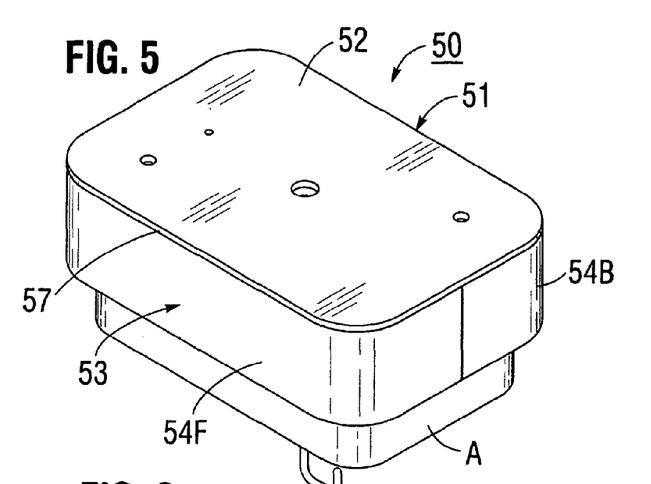
FIG. 5 is an upper perspective view of the enclosure of FIG. 4.
Figure 6:
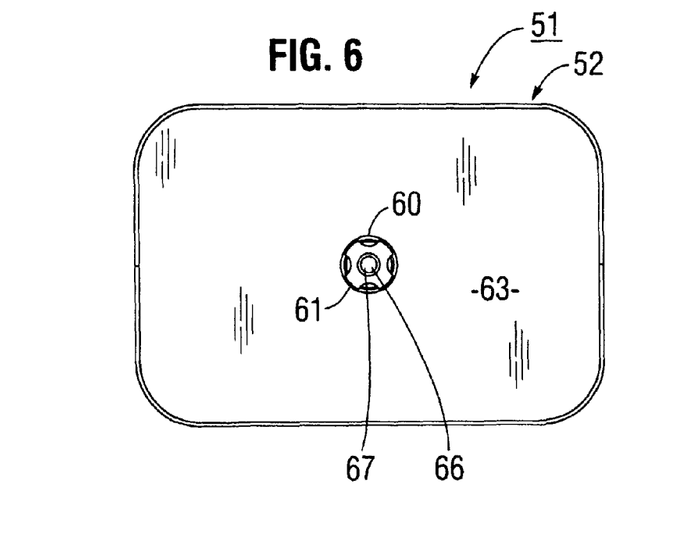
FIG. 6 is an upper plan view of an enclosure cover of the enclosure of FIG. 5.
Figure 7:
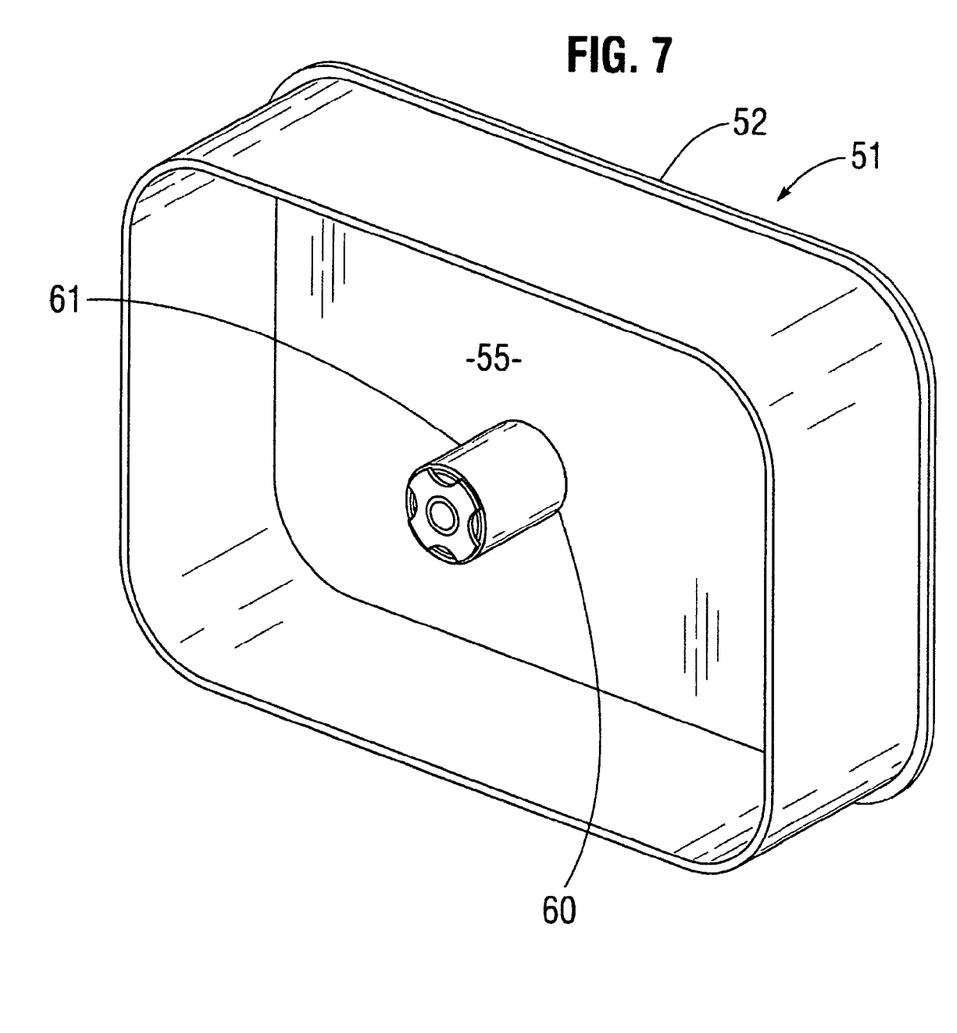
FIG. 7 is a lower perspective view of the enclosure cover of FIG. 6.
Figure 8:
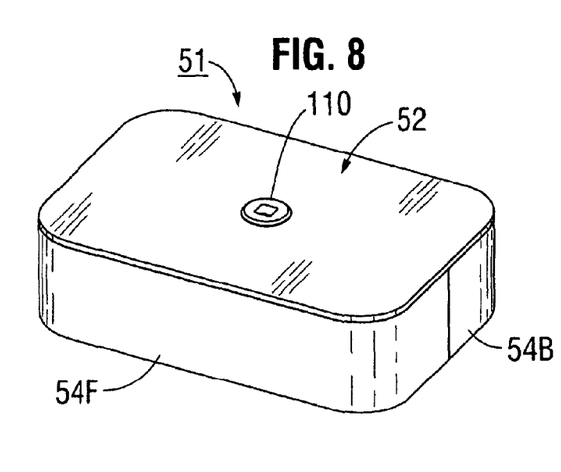
FIG. 8 is an upper perspective view of the enclosure cover of FIG. 6.

Preferably, as shown in FIG. 5 flange wall 53 consists of identical front and rear shroud sections 54F, 54B which are formed from laterally elongated, vertically disposed steel plates which are bent into a U-shaped plan-view profile. Shroud sections 54F, 54B are welded to the lower surface 55 of cover plate 52 so that the veridical vertical surface 56 of flange wall 53 is aligned with the outer peripheral edge wall 57 of the cover plate. Optionally, as shown in FIGS. 2-5, enclosure cover 51 may include elongated right-angle bracing brackets 58A, 58B, 58C and 58D which protrude from lower surface 55 of cover plate 52. As shown in FIGS. 2 and 4, angle brackets 58 are parallel to and located inwardly from the inner surface of outer peripheral flange wall 53 a distance equal to the wall thickness of the upper ends of side walls of pull box A.

Figure 19:
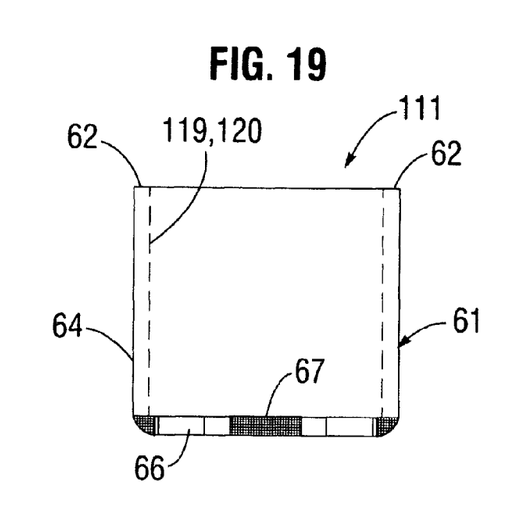
FIG. 19 is a vertical medial sectional view of a sleeve cup assembly part of the cover shown in FIGS. 6-10.
Figure 20:
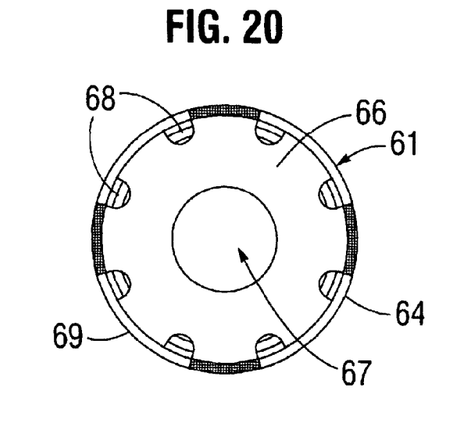
FIG. 20 is a lower plan view of the sleeve cup assembly of FIG. 19.

Referring to FIGS. 7-10, 19 and 20, it may be seen that cover plate 52 of enclosure cover 51 has through the its thickness dimension a vertically located bore 60 in which is welded a hollow cylindrically-shaped sleeve cup 61 which has an upper transverse annular surface 62 that is co-planar with upper surface 63 of the cover plate. Cup 61 has a cylindrical body 64 which extends perpendicularly downwards below lower surface 55 of cover plate 52, and is closed at lower end of the body by a circular disk-shaped lower end plate 66. Lower end plate 66 has through its thickness dimension a coaxially centrally located circular hole 67. As shown in FIGS. 19 and 20, lower end plate 66 also has through it thickness dimension a series of circumferentially spaced apart, generally semi-circularly shaped notches 68 which extend inwardly from the outer circumferential edge wall 69 of the lower end plate, the notches serving as water drain ports.

Figure 21:
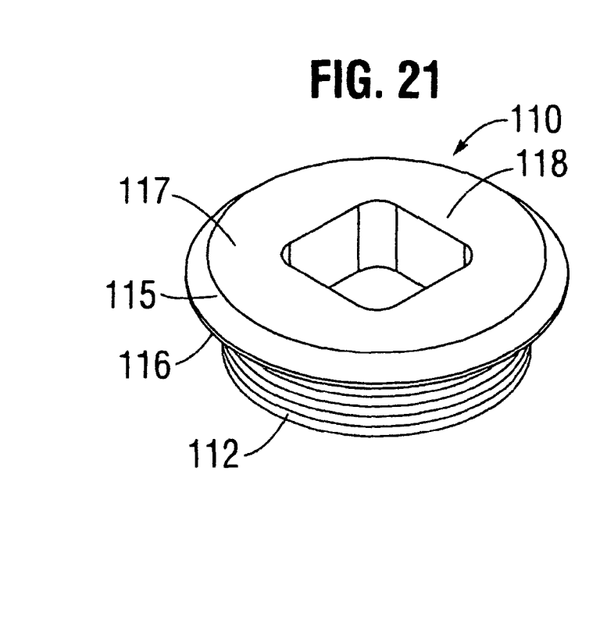
FIG. 21 is an upper perspective view of a cover cap for the wire protection enclosure of FIGS. 2-5.
Figure 22:
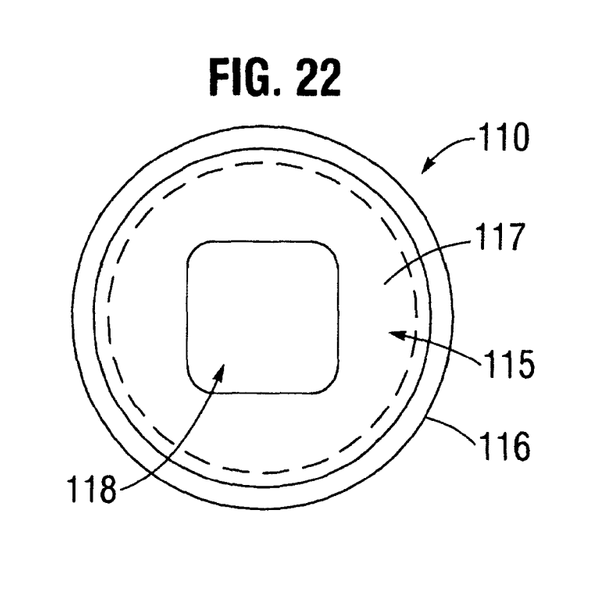
FIG. 22 is an upper plan view of the cover cap of FIG. 21.
Figure 23:
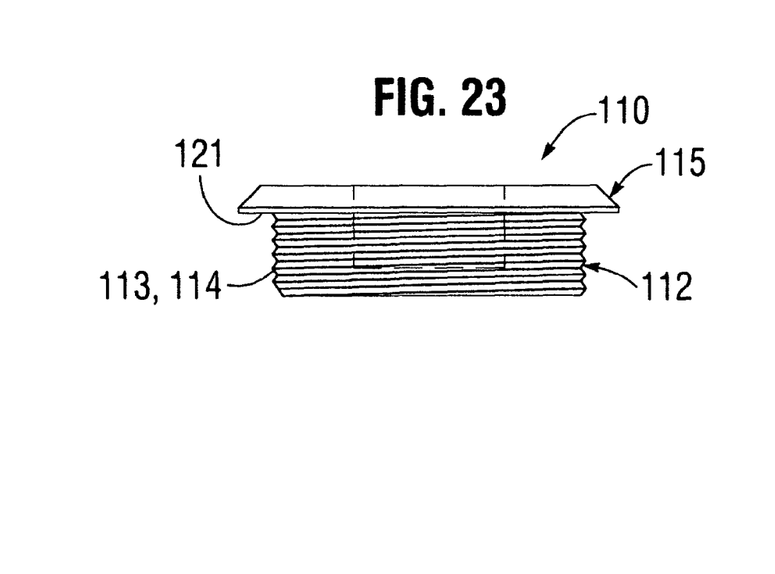
FIG. 23 is a side elevation view of the cover cap of FIGS. 21 and 22

As shown in FIGS. 21-23, wire theft protection enclosure 50 includes a cap plug 110 for enclosing the open upper end 111 of sleeve cup 61. Cap plug 110 has a short, cylindrically-shaped body 112 which has formed in the outer longitudinally disposed surface 113 thereof a helical thread 114. Cap plug 110 has at the upper end of body 112 thereof a flat, circular disk-shaped flange 115 which has an outer circumferential edge wall 116 that protrudes radially outwards of cylindrical body 112.

As shown in FIGS. 21 and 22, flange 115 of cap plug 110 has a flat upper surface 117 in which is formed a coaxially centrally located blind square cross-section socket 118 for receiving a square cross-section drive lug of a wrench.

Figure 9:
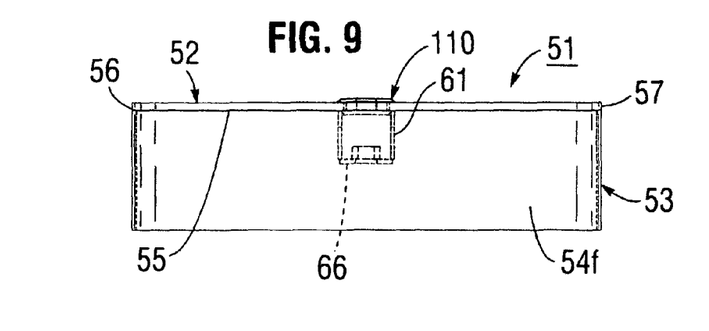
FIG. 9 is a longitudinal vertical medial sectional view of the enclosure cover of FIG. 6.
Figure 10:
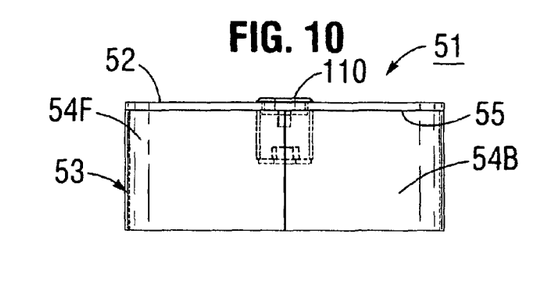
FIG. 10 is a transverse medial sectional view of the enclosure cover of FIG. 6.

Referring to FIGS. 9, 19 and 20, it may be seen that the threaded surface 113 of cap plug body 112 is threadably receivable within a threaded bore 120 in the inner circumferential wall surface 119 of sleeve cup 61 which extends downwardly from the open upper end of the sleeve cup. Thus, as may be understood by referring to FIGS. 9, 19, 21, and 23, cap plug 110 may be threadably tightened in the threaded bore 120 of sleeve cup 61 until the lower annular surface 121 of flange 115 seats onto upper annular surface 62 of the sleeve cup.

Figure 25:
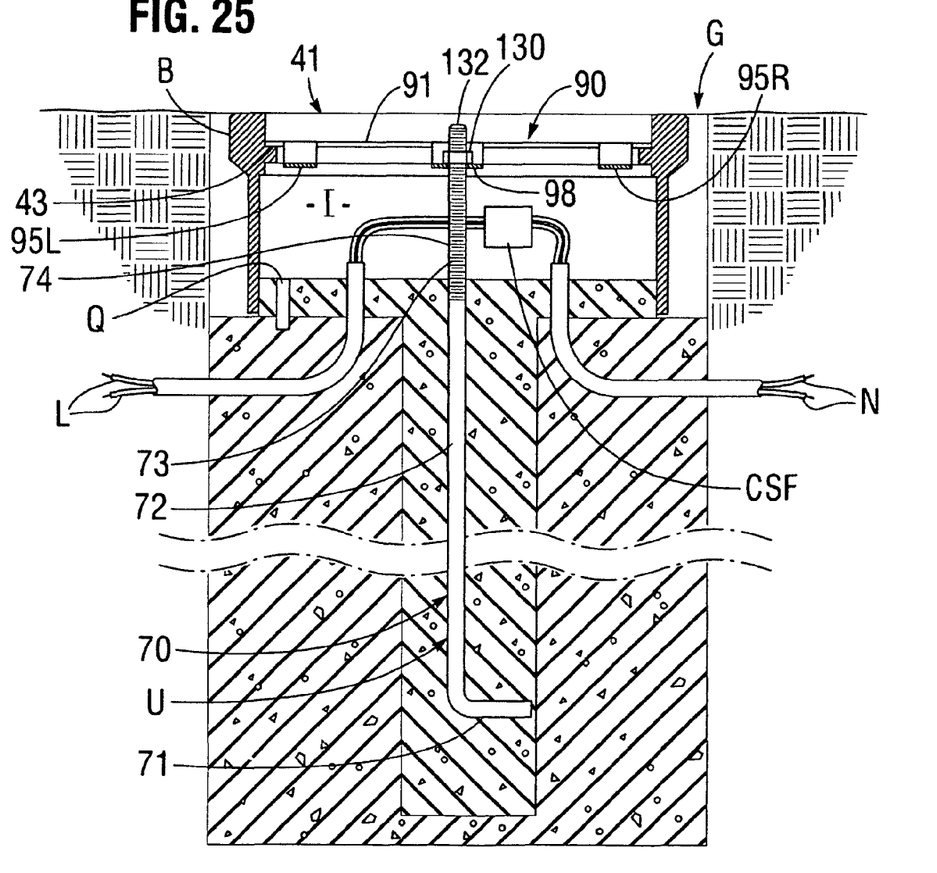
FIG. 25 is a vertical medial sectional view of the arrangement of FIG. 24.
Figure 26:
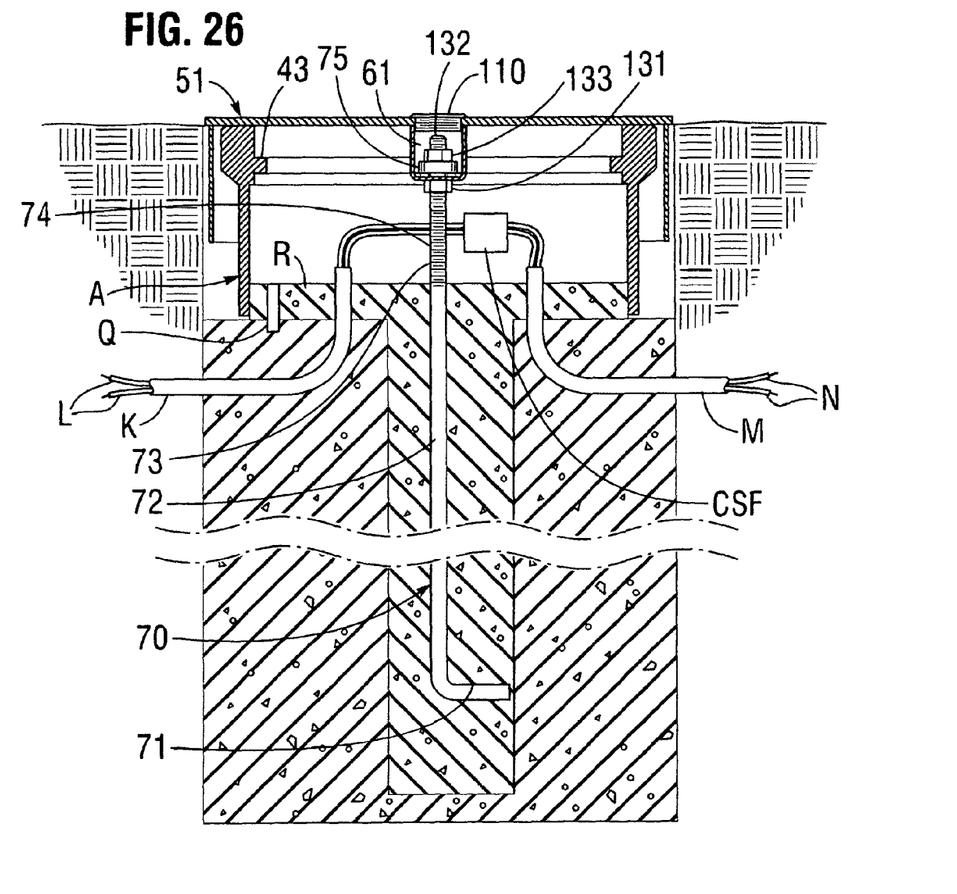
FIG. 26 is a vertical medial sectional view of a wire protection enclosure according to the present invention, showing the enclosure installed on a concrete pull box shell secured in a pit in the ground.
Figure 27:
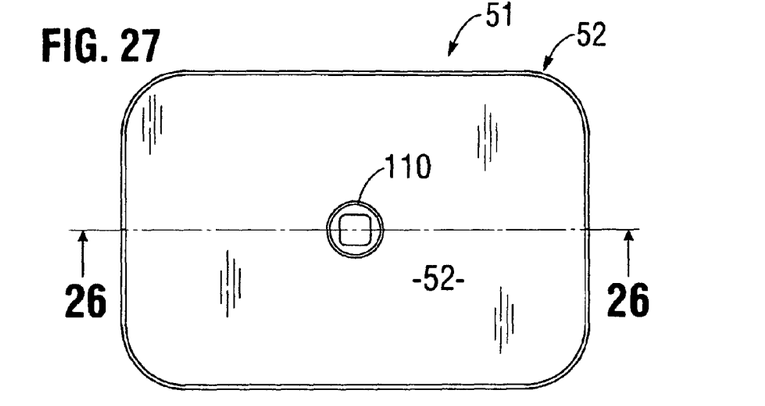
FIG. 27 is an upper plan view of the arrangement of FIG. 24.

As shown in FIGS. 25 and 26 and as will be described in detail below, wire theft protection enclosure 50 includes a J-bolt 70 that is secured in the ground and serves as an anchor member to which enclosure cover 51 is removably attachable. J-bolt 70 is made of a steel or iron rod which has, for example, a diameter of 1 inch. J-bolt 70 has at the lower end thereof a short, laterally outwardly disposed anchor leg 71 which has a length of about 3 inches, and a long vertically disposed upstanding shank 72 which is bent perpendicularly upwards from an inner end of the anchor leg. Shank 72 has a typical length of about five feet, and has an upper end section 73 about 8 inches long which has formed in the outer surface of the shank a helical screw thread 74. The upper threaded end section 73 of J-bolt shank 72 is receivable through hole 67 of bottom end cap 66 of enclosure cover cup 64, and fastenable thereto using a novel tamper-proof oval locking security nut and tool according to the present invention, as will now be described.

Figure 11:
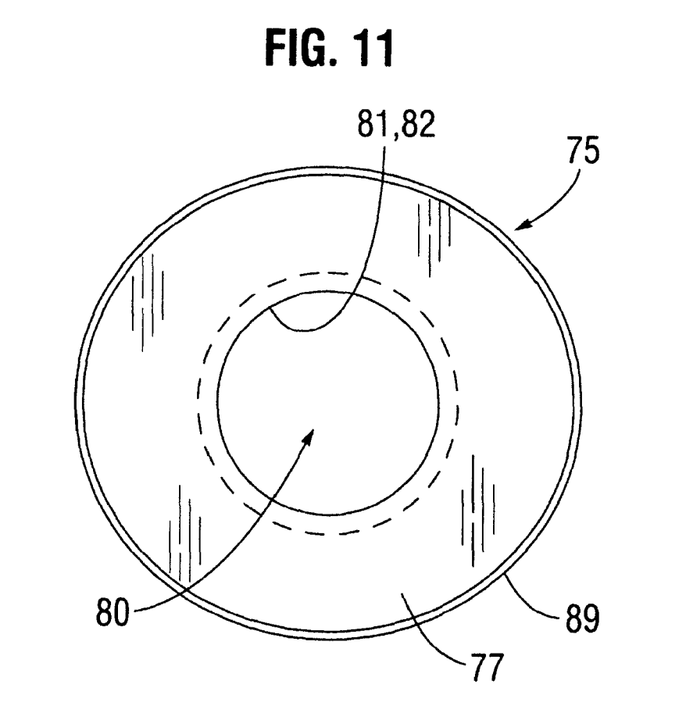
FIG. 11 is an upper plan view of an oval security nut of the enclosure of FIG. 2.
Figure 12:
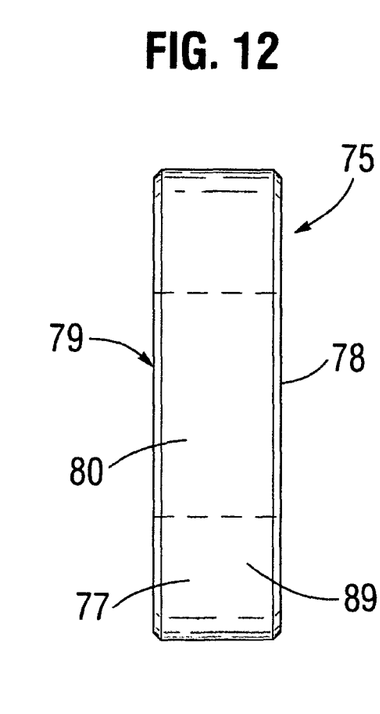
FIG. 12 is a side elevation view of the oval security nut of FIG. 14.
Figure 13:
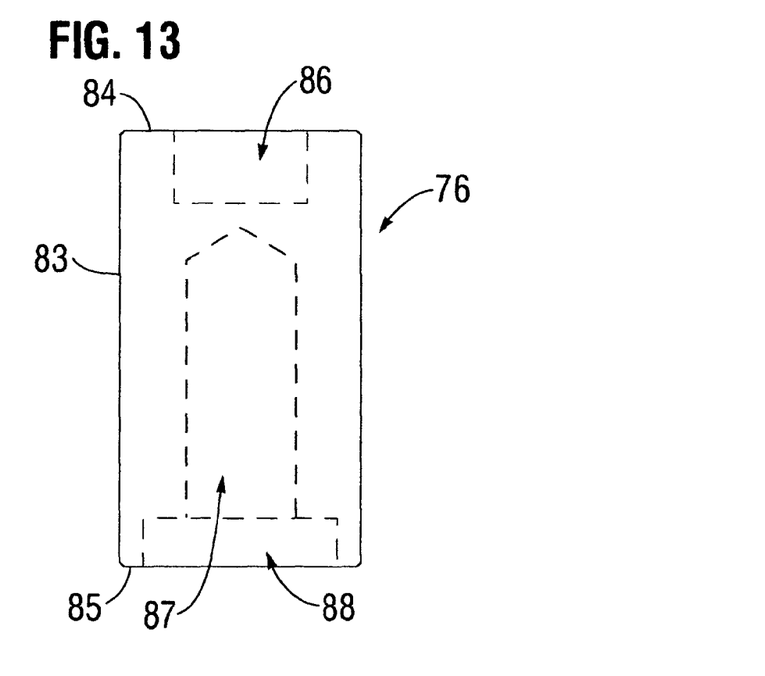
FIG. 13 is a vertical medial sectional view of a tool for torquing the oval nut of FIGS. 14 and 15.
Figure 14:
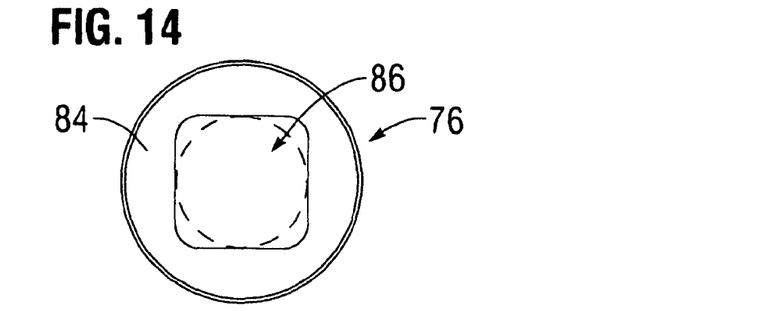
FIG. 14 is an upper plan view of the tool of FIG. 16.
Figure 15:
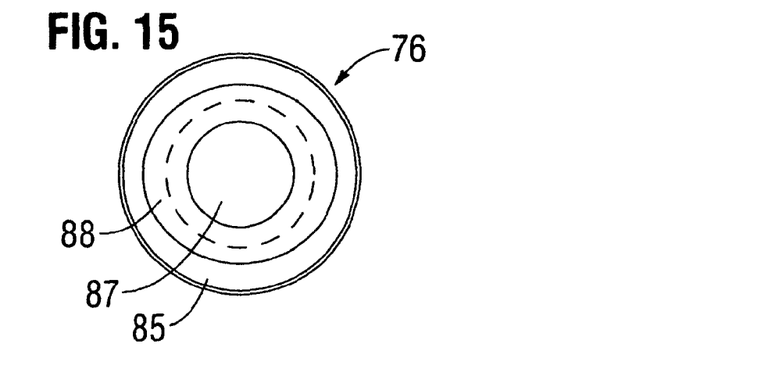
FIG. 15 is a lower plan view of the tool of FIG. 16.

FIGS. 11-12 illustrate a novel oval security nut 75 according to the present invention for fastening enclosure 51 to J-bolt 70, and FIGS. 13-15 show a novel tool 76 according to the present invention for installing on and removing the nut from the J-bolt.

Referring first to FIGS. 11 and 12, it may be seen that oval security nut 75 has a body 77 which has generally the shape of a oval plan-view disk of uniform thickness. Body 77 has flat and parallel upper and lower sides 78, 79. As shown in FIGS. 11 and 12, body 77 of nut 75 has through its thickness dimension a coaxially centrally located bore 80 which has formed on the inner facing peripheral wall 81 thereof helical threads 82. Threaded wall surface 81 and threads 82 have a major diameter minor diameter and thread pitch which are of the appropriate sizes to be compatible with the external threaded surface 74 or the upper end 73 of J-bolt 70, and thus enable nut 75 to be threadably attached to and removed from the J-bolt.

As shown in FIG. 11, the cross sectional shape of oval nut 75 is essentially elliptical. In an example embodiment of nut 75, the plan-view shape of nut 75 was essentially that of an ellipse having a major diameter of about 1.996 inch and a minor diameter of about 1.846 inch.

FIGS. 13-15 illustrate details of a novel tool 76 used to apply torque to nut 75 to thus tighten or loosen the oval nut from the shank of J-bolt 70.

As shown in FIGS. 13-15, tool 76 has a longitudinally elongated, circular transverse cross-section cylindrical body 83 which has an upper flat transverse surface 84 which is perpendicular to the longitudinal axis of the cylindrical body, and lower flat transverse surface 85 which is parallel to the upper surface.

As shown in FIGS. 13 and 14, upper surface 84 of tool body 83 has extending perpendicularly downwardly therefrom into the body a coaxially centrally located square cross-section, blind recess 86 for receiving the drive stud of a wrench.

As shown in FIGS. 14 and 15, lower surface 85 of body 83 of tool 76 has extending perpendicularly upwards therefrom into the body a coaxially centrally located clearance bore 87. As will be described later, clearance bore 87 is provided to provide clearance for the upper end of J-bolt shank 73 when tool 76 is used to tighten or loosen nut 75 on the J-bolt shank. Thus clearance bore 87 has a diameter slightly larger than that of J-bolt 70, e.g., about 1½ inches for a J-bolt having a one-inch diameter shank. As is shown in FIG. 14, clearance bore 87 has a depth sufficient to accommodate that part of threaded section 73 of shank 72 of J-bolt 70 that protrudes upwardly from nut 75 when the tool 76 is used to apply torque to the nut. In an example embodiment of tool 76, clearance bore 87 has a depth of about 3½ inches.

Referring to FIGS. 13 and 15, it may be seen that lower surface 85 of body 83 of tool 76 also has extending perpendicularly upwards therefrom into the body an elliptical cross-section counter-bore 88 which is centered on and of larger diameter than bolt shank clearance bore 87. Counter-bore 88 is used to conformally receive and irrotatably engage the outer peripheral wall surface 89 of oval nut 75. Thus, counter-bore 88 has a depth approximately equal to the thickness of oval nut 75, e.g., ½ inch. Counter-bore 88 also has a uniform transverse cross-sectional shape which has generally the same outline shape as oval nut 75, but slightly larger. Thus, in an example embodiment of tool 76, counter-bore 88 has an essentially elliptical shape, with a major diameter of about 2.0005 inch and a minor diameter of about 1.855 inch.

Figures 16, 17, 18:
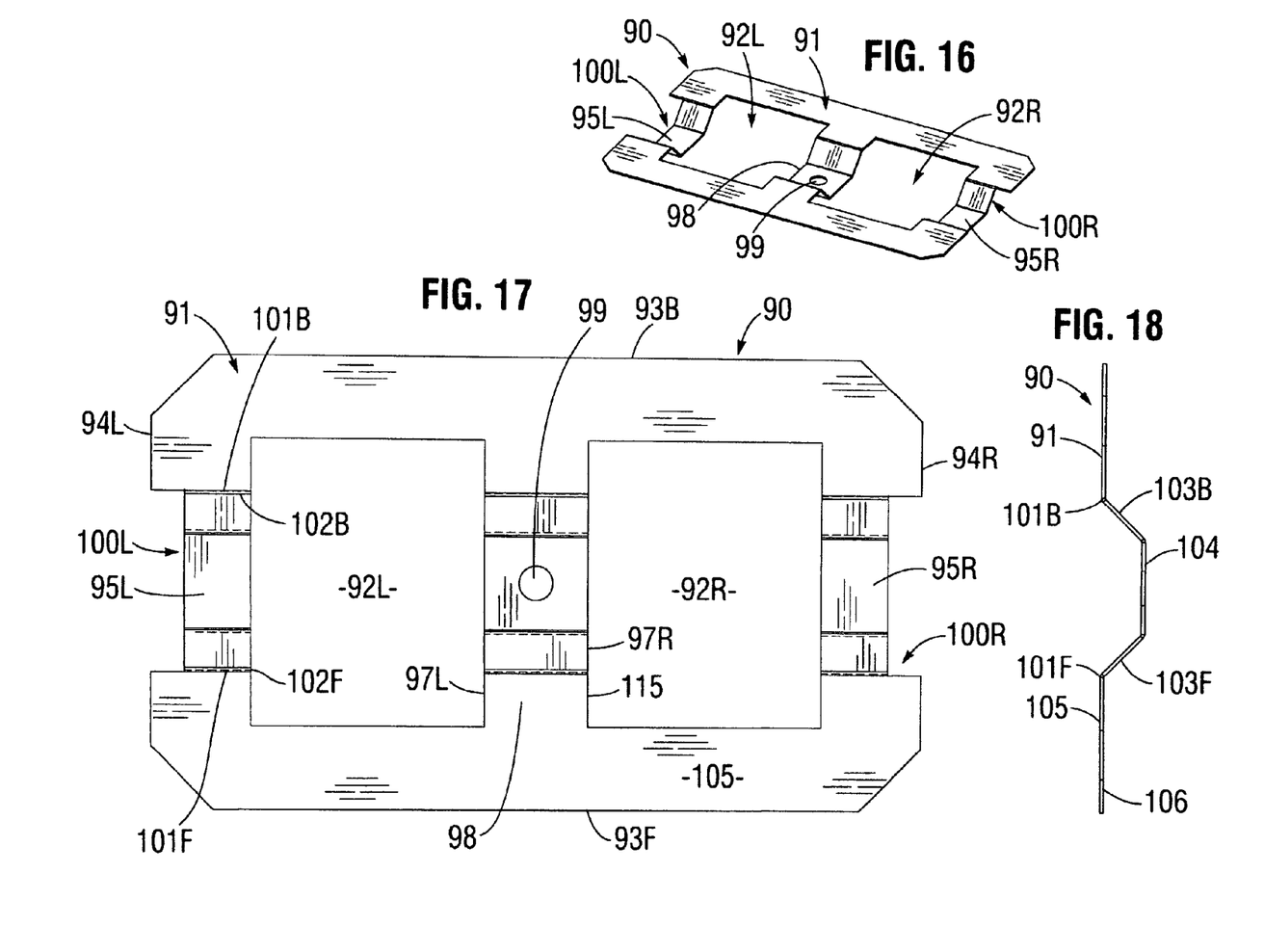
FIG. 16 is an upper perspective view of a locator template tool used to install the enclosure of FIG. 2.
FIG. 17 is an upper plan view of the template tool of FIG. 16.
FIG. 18 is an end elevation view of the template tool of FIG. 16.

FIGS. 16-18 illustrate a novel template tool 90 according to the present invention which is used in a method of anchoring a pull box in the ground.

As shown in FIGS. 16-18, template tool 90 has generally the shape of a laterally elongated rectangularly-shaped thin, flat metal plate 91. As shown in FIG. 17, plate 91 of template tool 90 has through its thickness dimension two large laterally spaced apart rectangular perforations 92L, 92R which are centered between front and rear edges 93F, 93B of the plate. Perforations 92L, 92R are spaced laterally inwards equal distances from left and right fore-and-aft disposed left and right edges 94L, 94R of plate 91. The outer fore-and-aft disposed edges of perforations 92L, 92R form between the left and right edges 94L, 94R of plate 91 fore-and-aft disposed, rectangularly-shaped webs 95L, 95R, respectively.

Also, as shown in FIG. 17, inner straight fore-and-aft disposed edges 97L, 97R of left and right perforations 92L, 92R form therebetween a fore-and-aft disposed, laterally centrally located central rectangularly-shaped web 98.

As shown in FIG. 17, central web 98 has through its thickness dimension a centrally located circular bolt-shank hole 99. As is also shown in FIG. 17, the left and right outer fore-and-aft disposed edges 94L, 94R of tool template plate 91 have extending laterally inwards thereof elongated rectangularly-shaped left and right hand-grip notches 100L, 100R which penetrate and are centered longitudinally in the outer sides of fore-and-aft disposed webs 95L, 95R.

As shown in FIGS. 17 and 18, tool template plate 91 has a laterally centrally located recessed area bordered fore-and-aft by laterally disposed front and rear bend lines 101F, 101B that are coextensive with fore-and-aft laterally disposed edges 102F, 102B of notches 100L, 100R. As shown in FIG. 18, plate 91 is recessed downwards from front and rear bend lines 101F, 101B to straight obliquely disposed front and rear rectangular web sections 103F, 103B 103F, 103B. The obliquely downwardly angled web sections 103F, 103B angle towards a laterally disposed center line of plate 91, and terminate in a laterally disposed flat rectangular center web plate 104 which is located below 104 which is below and parallel to the upper surface 105 and lower surface 106 of plate 91.

FIGS. 24-27 illustrate a novel method of utilizing the wire protection enclosure 50 described above to cover an existing pull box and thereby protect against theft of wires interconnected within the interior of the pull box.

According to a method of upgrading or retrofitting an existing pull box installation which uses a pull box A of the type shown in FIGS. 1A and 1B, the following steps are performed.

First, electric power supplied to the pull box A is shut off.

Second, referring to FIGS. 1A and 1B, the concrete cover lid aa or 45 of the pull box A is removed from the shell B of the pull box.

Third, the shell B is then removed from the ground by digging up soil adjacent to the exterior of the shell, and pulling the shell upwards out of the ground, thus exposing inlet and outlet electric power conduits K and M and the electrical cables L and N which protrude from open upper ends of the conduits and are interconnected through splices which may include connectors and fuse holders.

Fourth, the area of the pit G in which the pull box A was installed is cleared of debris, and as shown in FIG. 25, a circular cross-section bore hole U having a diameter of about 4 inches is bored perpendicularly downwards into the ground from the center of the floor of the pit G. The bore U is made to a pre-determined depth of, for example, 4 feet.

Fifth, the lower end of a J-bolt 70 is inserted downwardly into the opening of bore U until the anchor leg 71 at the lower end of the J-bolt rests on the bottom end wall of the bore.

Sixth, the shell B of pull box A is reinserted downwards into pit G and seated on the floor of the pit, positioning the shell so that the upstanding shank 72 of J-bolt 70 is approximately centered within interior I of the shell.

Seventh, concrete is poured into the open upper end of shell B and into the interior I of the shell, and into the open upper end of bore U and on the floor of pit G to a depth of about 2-4 inches.

Figure 24:
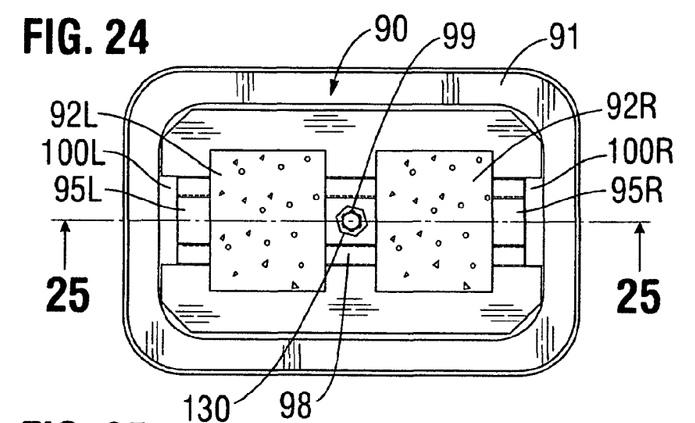
FIG. 24 is an upper plan view showing the template tool of FIGS. 16-18 temporarily placed on a concrete pull box to be secured in a pit in the ground.

Eighth, while the poured concrete is still semi-fluid, template tool 90 is lowered downwardly into upper opening 41 of the shell B. Shell B is then manipulated by a workman until the upwardly protruding shank 72 of J-bolt 70 is vertically aligned with circular hole 99 through central web plate 98 of template tool 90. Template tool 90 is then inserted fully downward into opening 41 of shell B, until the lower surface of the template tool seats on the rectangularly-shaped ledge 43 in the inner wall surface of the shell B.

Ninth, a hex nut 130 is threaded onto the threaded upper end 73 of J-bolt shank 72 which protrudes above the upper surface 104 of template tool center web plate 98, and the hex nut tightened down onto the upper surface of the center web plate. This procedure maintains the pull box shell B concentrically aligned with the shank 72 of J-bolt 70 while the concrete hardens.

Tenth, while the poured concrete is still in a semi-liquid state, a water drain hole or "weep" hole is made through the poured concrete mass on the floor of the pull box pit G within the interior space I of the pull box shell B, by inserting an elongated rod or stake down through the concrete mass to the earthen floor of the pit and retracting the rod before the concrete solidifies. Sufficient time is then allowed for the poured concrete to harden.

Eleventh, the hex nut holding template tool 90 to the shank 72 of J-bolt 70 is unthreaded and removed from the J-bolt shank, whereupon the template tool is lifted upwardly off the shank of the J-bolt and out from the shell B of the pull box. Removal of the template tool 90 is facilitated by inserting fingers of the hands into left and right notches 100L, 100R in the left and right side edges 94L, 94R of tool template plate 91.

Twelfth, as shown in FIG. 26, a hex nut is threaded downwards into the threaded upper section 73 of J-bolt shank 72, to a pre-determined distance of for example, 3.25 inches, below the upper end 32 of the J-bolt shank.

Thirteenth, enclosure cover 51 is grasped and positioned above the shell B in vertical alignment with the rectangular upper end wall of the shell, so that the centrally located hole 67 through the bottom plate 66 of the cup 64 protruding downwardly from the lower surface 55 of enclosure cover plate 52 is aligned with the upwardly protruding shank 72 of J-bolt 70. The enclosure cover 51 is then lowered downwards on the upper end face of pull box shell B, so that shank 72 of J-bolt 70 protrudes upwardly through hole 67 through cover plate cup 64 and the lower surface of cover plate 52 seats on the upper surface of the pull box shell B.

Fourteenth, oval security nut 75 is grasped and oriented with the bore 80 through the nut vertically aligned with the protruding upper end 73 of shank 72 of the J-bolt 70. Security nut 75 is then manually threaded onto protruding shank section 73 of the J-bolt 70, and manually tightened down onto the upper surface 62 of sleeve cup 61.

Fifteenth, the oval security nut tool 76 is grasped and positioned above oval security lock nut 75 so that the oval bore 88 extending into the bottom transverse face 85 of the tool is longitudinally vertically aligned with the transverse cross-section oval perimeter of the oval nut 75, and the tool lowered to receive the nut conformally within the tool bore. The square drive lug of a wrench is then inserted into the drive lug recess 86 which extends downwardly into the upper transverse face 84 of the oval drive nut tool 76, and the wrench used to tighten oval security nut 76 tightly onto the threaded shank of J-bolt 70, to a torque of, for example, about 200 foot-pounds.

Sixteenth, a nut 133 having a non-standard, pentagonal cross-section is threaded onto the protruding shank of the J-bolt and tightened down onto the upper surface of the oval nut 75, using a security nut tool similar to tool 76, but having a pentagonal rather than elliptical drive cross-section. Seventeenth, cap plug 110 is threaded into threaded bore 119 of sleeve cup 61, and also tightened to a torque of about 200 foot-pounds.

What is claimed is:

1. A method for thwarting access to electrical wires interconnected within an electrical junction box enclosure buried in the ground to thereby protect against theft of wire from the enclosure, said method comprising the steps of:
    a. forming a bore hole downward into a surface of the ground on which a shell of a junction box enclosure rests,
    b. inserting an elongated J-bolt downward into said bore hole, said J-bolt having at a lower end thereof a laterally outwardly disposed anchor leg and an elongated straight shank which depends perpendicularly upwards from a laterally inwardly located end of said anchor leg,
    c. pouring semi-liquid concrete into the interior of said enclosure and into said bore hole,
    d. placing a horizontally disposed cover lid on an upper surface of said enclosure, said cover id having disposed therethrough an aperture which receives an upper threaded end of said shank of said J-bolt, and
    e. threadingly tightening a first internally threaded member onto said upper threaded end of said shank of said J-bolt and onto an upper facing surface of said cover lid, said first internally threaded member having a convex, arcuately curved oval transverse cross-sectional shape.

2. The method of claim 1 wherein said external transverse cross-sectional shape of said internally threaded member is further defined as being elliptical.

3. A modification kit for upgrading pull box-type electrical junction boxes to thwart access to electrical wires interconnected within the interior space of a shell of a pull-box type electrical junction box, said kit including a cover lid comprising;
    a. a plate having an outline shape and size approximately that of the upper transverse cross-sectional outline of a pull box shell,
    b. a cylindrically-shaped cup which protrudes downwardly from a lower surface of said plate at a central location thereof, said cup having an open upper end which is aligned with a bore disposed perpendicularly through the center of said plate, said cup having a disk-shaped lower end plate penetrated through its thickness dimension by a centrally located aperture which is coaxial with said bore through said plate, and
    c. an internally threaded fastener which has an external transverse cross-sectional plane that has no more than two longitudinally disposed planes of symmetry, said fastener having an internally threaded bore for threadably receiving the upstanding threaded shank of a J-bolt received upwardly through said aperture through said lower end plate of said cup, and threadably tightenable downward on said J-bolt shank onto the upper surface of said lower end plate to thereby fix the position of said enclosure cover lid relative to said J-bolt, and
    d. a template for maintaining a central vertical axis of said pull box enclosure shell aligned with the longitudinal axis of the upstanding shank of a J-bolt, the lower end of which J-bolt is contained in solidifying concrete filling a bore hole which extends into the ground from the base floor of a pit in which said shell is being placed, said template comprising a plate having an outline shape corresponding to that of an upper entrance opening into said enclosure shell, an outline size less than that of said opening and greater than that of a lid support ledge protruding from the inner peripheral wall surface of the entrance shell, said template having through its thickness dimension a centrally located hole for receiving the upstanding shank of a J-bolt.

4. The kit of claim 3 wherein said template has a central web in which said centrally located hole is located, a first pair of laterally spaced apart apertures located on opposite sides of said central web, and a first pair of laterally spaced apart outer webs located on outer sides of said laterally opposed apertures.

5. The kit of claim 4 wherein said central web section is recessed below outer edge sections of said template.

6. The kit of claim 3 wherein said external transverse cross-sectional shape of said internally threaded fastener is further defined as being oval.

7. The kit of claim 6 further including a tool for tightening and loosening said oval cross-section fastener, said tool comprising an elongated cylindrical body having in an upper transverse end wall thereof a blind recess for receiving the drive stud of a wrench, and extending upwardly from a lower transverse end wall thereof a coaxial centrally located clearance bore for receiving the shank of a J-bolt, and a shorter, larger diameter oval cross-section bore for insertably receiving the body of a flat, oval cross-section nut.

8. The kit of claim 6 further including a second internally threaded fastener tightenable onto said threaded shank of said J-bolt, said second internally threaded fastener having no more than one longitudinally disposed symmetry plane.

9. The method of claim 6 wherein said external cross-sectional shape is further defined as bing elliptical.

10. The kit of claim 9 wherein the transverse cross-sectional shape of said second internally threaded fastener is further defined as being pentagonal.

11. The kit of claim 10 further including a tool for tightening and loosening said oval cross-section fastener, said tool comprising an elongated cylindrical body having in an upper transverse end wall thereof a blind recess for receiving the drive stud of a wrench, and extending upwardly from a lower transverse end wall thereof a coaxial centrally located clearance bore for receiving the shank of a J-bolt, and a shorter, larger diameter oval cross-section bore for insertably receiving the body of a flat, oval cross-section nut.

12. A method for thwarting access to electrical wires interconnected within an electrical junction box enclosure buried in the ground to thereby protect against theft of wire from the enclosure, said method comprising the steps of:
    a. forming a bore hole downward into a surface of the ground on which a shell of a junction box enclosure rests,
    b. inserting an elongated J-bolt downward into said bore hole, said J-bolt having at a lower end thereof a laterally outwardly disposed anchor leg and an elongated straight shank which depends perpendicularly upwards from a laterally inwardly located end of said anchor leg,
    c. pouring semi-liquid concrete into the interior of said enclosure and into said bore hole,
    d. placing a horizontally disposed cover lid on an upper surface of said enclosure, said cover id having disposed therethrough an aperture which receives an upper threaded end of said shank of said J-bolt,
    e. threadingly tightening a first internally threaded member onto said upper threaded end of said shank of said J-bolt and onto an upper facing surface of said cover lid, said first internally threaded member having a transverse cross-sectional shape which has no more than two longitudinally disposed planes of symmetry, and
    f. tightening a second internally threaded member onto said upper threaded end of said shank of said J-bolt and onto one of an upper surface of said first internally threaded member and an upper facing surface of said lower lid.

13. The method of claim 12 wherein the maximum radial sizes of said first and second internally threaded members are different.

14. A method for thwarting access to electrical wires interconnected within an electrical junction box enclosure buried in the ground to thereby protect against theft of wire from the enclosure, said method comprising the steps of:
    a. forming a bore hole downward into a surface of the ground on which a shell of a junction box enclosure rests,
    b. inserting an elongated J-bolt downward into said bore hole, said J-bolt having at a lower end thereof a laterally outwardly disposed anchor leg and an elongated straight shank which depends perpendicularly upwards from a laterally inwardly located end of said anchor leg,
    c. pouring semi-liquid concrete into the interior of said enclosure and into said bore hole,
    d. placing a horizontally disposed cover lid on an upper surface of said enclosure, said cover id having disposed therethrough an aperture which receives an upper threaded end of said shank of said J-bolt,
    e. threadingly tightening a first internally threaded member onto said upper threaded end of said shank of said J-bolt and onto an upper facing surface of said cover lid, and
    f. maintaining a central vertical axis of said enclosure aligned with the longitudinal axis of said J-bolt while said poured concrete is hardening, said step of maintaining a central vertical axis of said enclosure aligned with the longitudinal axis of said J-bolt while said poured concrete is hardening including steps of;
        i. attaching a template to the shell of said enclosure, said template having through its thickness dimension a centrally located aperture which is co-linear with the central vertical axis of said enclosure shell,
        ii. moving said enclosure shell laterally until said aperture through said template is vertically aligned with the upstanding shank of said J-bolt,
        iii. moving said enclosure shell downwards until said upstanding shank of said J-bolt protrudes upwardly through said aperture through said template,
        iv. tightening a threaded member down onto the upstanding threaded shank of said J-bolt and an upper surface of said template until said poured concrete sets, and
        v. removing said threaded member and said template after said poured concrete sets.

* * * * *